United States Patent
Bhave et al.

(10) Patent No.: US 7,818,756 B2
(45) Date of Patent: Oct. 19, 2010

(54) SKU DETERMINATION MECHANISM AND API

(75) Inventors: Ajay Bhave, Redmond, WA (US); Ning Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1197 days.

(21) Appl. No.: 11/249,118

(22) Filed: Oct. 12, 2005

(65) Prior Publication Data

US 2007/0083860 A1    Apr. 12, 2007

(51) Int. Cl.
*G06F 9/44* (2006.01)
(52) U.S. Cl. .................................. 719/320; 719/328
(58) Field of Classification Search ............ 719/328
See application file for complete search history.

(56) References Cited

U.S. PATENT DOCUMENTS

| | | | | |
|---|---|---|---|---|
| 6,658,659 | B2 * | 12/2003 | Hiller et al. | 717/170 |
| 2002/0199180 | A1 * | 12/2002 | Donaldson et al. | 717/178 |
| 2003/0217188 | A1 * | 11/2003 | Kung et al. | 709/310 |

* cited by examiner

*Primary Examiner*—Hyung S Sough
*Assistant Examiner*—Syed Roni
(74) *Attorney, Agent, or Firm*—Woodcock Washburn LLP

(57) ABSTRACT

Applications or operating system components requiring a SKU, or other indicator of an operating system, make a call to an API. The calling application passes an indicator of the most current version of an operating system known at the time of the application creation as an argument. This argument may be an indictor of the operating system version, build number, and service pack version, for example. The called API may reference a table of operating system SKUs with the indicator of the most current operating system known to the calling application. If found, the API returns the corresponding SKU to the calling application. If not found, the API returns the SKU corresponding to the closest sequential match to the passed in indicator. The calling application may then execute believing it is using the operating system corresponding to the returned SKU.

14 Claims, 3 Drawing Sheets

SKU DETERMINATION MECHANISM AND API

BACKGROUND

Many applications and operating system components are programmed to use operating system identification information to make certain run-time decisions. These operating system identifiers are commonly referred to as Stock Keeping Units (SKUs). By identifying the operating system at run-time, rather than when the applications are compiled, the applications or operating system components are able to exist as a single binary for use on a variety of operating systems. Being able to make these decisions at run-time makes it possible to have a single binary that works seamlessly across different operating system SKUs. When the application or operating system component is selected for execution, a query is made for the SKU of the underlying operating system. Based on the returned SKU, aspects of the application or operating system component may be enabled or disabled in accordance with the capabilities of the operating system identified by the SKU. Typical operating system information identified by the SKUs includes the operating system version, operating system build number, service pack number, or any other information typically associated with operating systems.

Generally, the SKU information is requested by making a call to an application programming interface ("API") or other software program that then returns the SKU corresponding to the current executing operating system. However, APIs using this method create several problems. First, adding SKUs corresponding to new or improved operating systems to these APIs can create application compatibility issues. Often the calling applications have expected or supported SKUs hard coded into the application binaries. Accordingly, if the application is installed on an operating system that was unknown at the time the application was created, the application will abort because the returned SKU will not match any of the SKUs hard coded into the application. Given that the newer operating system may have been specifically designed to remain compatible with previous versions, unnecessary compatibility issues are created.

Second, because current applications rely on the returned SKU information to execute correctly, dropping the use of SKU information is not possible without breaking these legacy applications.

SUMMARY

Applications or operating system components requiring a SKU, or other indicator of an operating system, make a call to an API. The calling application passes an indicator of the most current version of an operating system known at the time of the application creation as an argument. This argument may be an indictor of the operating system version, build number, and service pack version, for example. The called API may reference a table of operating system SKUs with the indicator of the most current operating system known to the calling application. If found, the API returns the corresponding SKU to the calling application. If not found, and the indicator is not less than a predetermined minimum, the API returns the SKU corresponding to the closest sequential match to the passed in indicator. The calling application may then execute believing it is using the operating system corresponding to the returned SKU.

DETAILED DESCRIPTION

Figure 1:
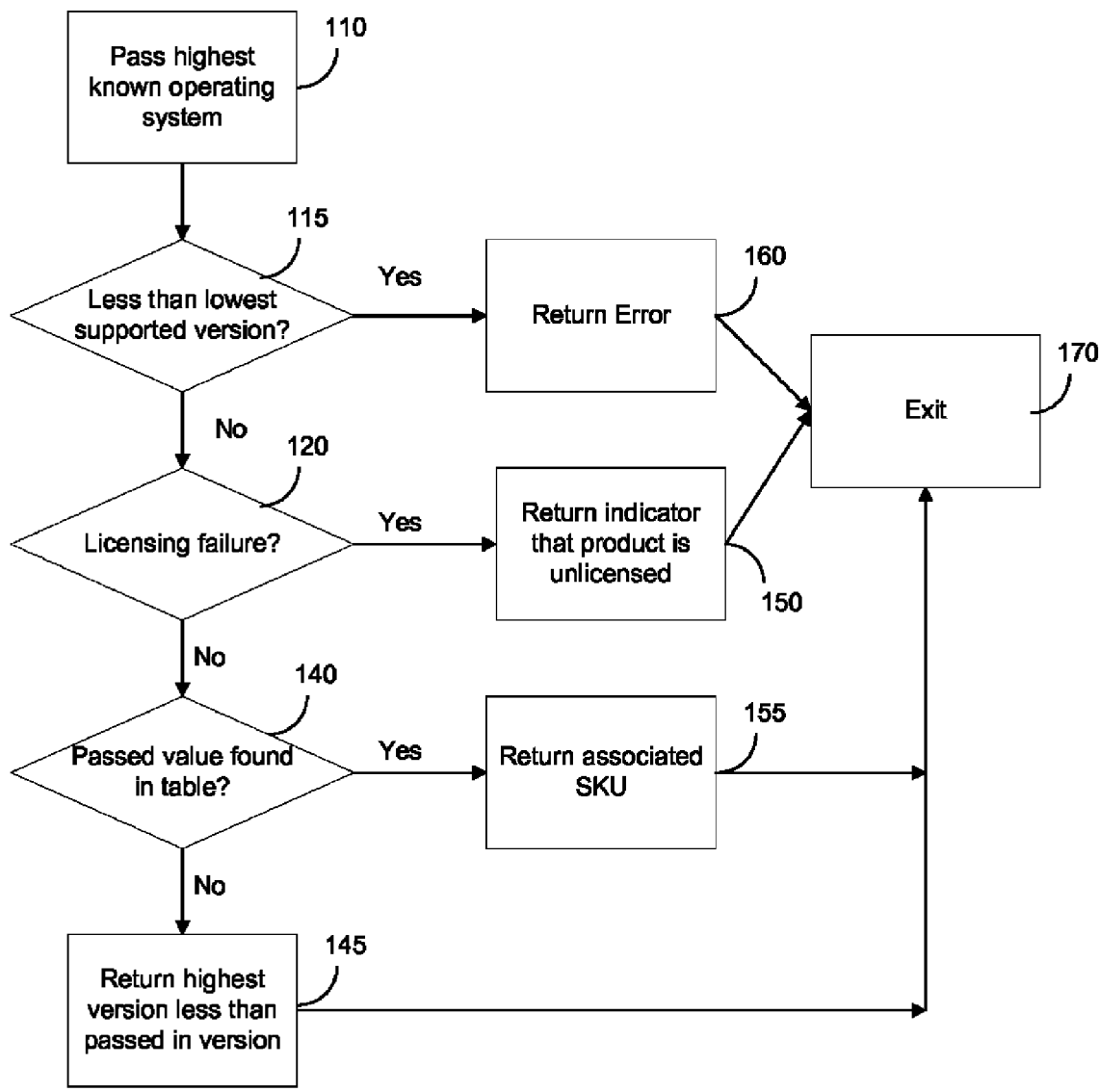
FIG. 1 is a flow diagram illustrating an exemplary method for SKU determination in accordance with the invention.

FIG. 1 is a block diagram illustrating an exemplary method for SKU determination in accordance with the invention. An application may make a procedure call to determine the SKU of the current operating system. The procedure call includes an indicator of the expected operating system. The current operating system determines its current version number and SKU. The indicator and the current operating system and SKU information may then be used to reference a table associating operating system versions with supported SKUs. If the indicator is located in the table then the corresponding SKU is returned to the calling application. If the indicator is not found, the SKU associated with the indicator that most closely matches the indicator is returned.

At 110, an application or other software or operating system component may make a procedure call to determine the SKU of the underlying operating system. As described previously, many applications may make such a determination at run-time to determine whether or not to enable certain operating system specific features, or which operating system specific function calls to use during execution of the application. By requesting the SKU, or other indicator of the operating system, a single binary of the application may be distributed with operating specific or dependent features being enabled or disabled at run-time according to the returned SKU.

However, a problem can be introduced into the application or software components where the application expects to receive certain SKU values, and is not prepared for unknown or more recent SKU values, even though the associated operating systems may be fully capable of supporting the application.

To correct this in future applications, an API may be designed that accepts the desired operating system as an argument. When the operating system receives the API call, including the desired operating system argument, the operating system can determine if the features of the desired operating system are supported in the current operating system, and if so, send the application a SKU, or other indicator, of the desired operating system. Thus, the application can execute normally, believing that it is executing in the desired operating system.

The application may make the API call by invoking a function with arguments corresponding to an expected, or most current version of the operating system that was known at the time of the application's creation. The arguments, or indicator of an operating system may take the form OSMajorVersion, OSMinorVersion, SPMajorVersion, and SPMinorVersion, for example. OSMajorVersion corresponds to the major version of the desired or expected operating system. OSMinorVersion corresponds to the minor version of the desired or expected operating system. SPMajorVersion corresponds to the service pack major version of the desired or expected operating system. SPMinorVersion corresponds to the service pack minor version of the desired or expected operating system. However, depending on the operating system name and numbering conventions selected by the operating system manufacturer or developer, a wide variety of arguments and argument formats may be supported. For example, an operating system manufacturer may assign consecutive integers to each operating system. For that case a single API argument for the integer corresponding to the desired operating system may be used.

At 115, the passed in operating system indicator is desirably compared against a minimum supported operating system. While it is desirable to support previous or legacy applications, because of operating system changes between successive versions it may not be feasible to support older operating systems after a long period of time. Therefore, there desirably exists a minimum, or boundary, operating system version such that operating systems created before that version may not be supported. This minimum operating system version may be set by a user or administrator of the system, for example.

The passed in operating system indicator may be compared against a variable representing the minimum operating system, or a translation table as described at 140 may be consulted. Any system, method, or technique known in the art for comparing against a minimum supported operating system may be used. If the passed in value exceeds, or is equal to, a minimum value, then the embodiment may continue at 120. Else, the embodiment may continue at 160.

At 120, the SKU and current version of the operating system may be determined. The current SKU and operating system version may be determined by referencing a licensing component, for example. If a suitable license for the operating system exists, then the licensing component desirably returns the associated SKU and operating system information and the embodiment may continue at 140. Else, the operating system is unlicensed and the embodiment may continue at 150. Note that determining the current SKU and operating system information through a licensing component is just one example of how the information may be determined. Any system, method, or technique in the art for determining the SKU and current operating system may be used.

At 140, the passed in operating system value and the SKU and operating system version number of the current operating system are used to locate the expected SKU in a SKU table, or other data structure. As each new operating system, or operating system update, is created, an entry for the operating system is desirably added to a table with the numbers corresponding to the operating systems that it supports. For example, consider the sample table below:

| 5.1.0.0 | 5.1.1.0 | 5.2.1.0 |
|---------|---------|---------|
| SKU1    | SKU1    | SKU4    |
| SKU2    | SKU2    | SKU2    |
| SKU2    | SKU3    | SKU3    |

As shown in the table, columns representing operating system versions are listed with row entries corresponding to SKUs supported by that operating system version. As shown, OS version 5.1.0.0 supports SKU1, and SKU2. While 5.1.1.0 supports SKU1, SKU2, and SKU3.

In order to determine which SKUs to return for a given passed in value, the column associated with the current operating system value is located. Next, the row corresponding to the current SKU is located in the column. Using the located row, the SKU entry in the column associated with the passed in operating system is identified and returned to the calling application. The SKUs may be passed to the calling application using any system, method, or technique known in the art for passing values.

For example, assume that the current operating system was determined to be 5.1.1.0 with SKU3. Also assume that the passed in operating system version is 5.1.0.0. To find the corresponding SKU to return to the calling application, the column of the table corresponding to the current operating system version 5.1.1.0 is located. This corresponds to the second column in the sample table. Next, the row containing the current SKU, SKU3, is located in the column. This corresponds to the third row in the sample table. After locating the third row, the entry in the third row of the column associated with the passed in operating system version is retrieved. In this example, the retrieved SKU is SKU2.

If a column for the passed in value is successfully located in the table, the SKU is desirably returned to the calling application at 155. Else, the embodiment may continue at 145.

At 145, the passed in value may not have had a corresponding column in the table. This may be because the passed in value may correspond to an operating system that is more current than, or created after, the table. To increase the probability that the calling application will work correctly, the operating system column closest to the passed in version is desirably used instead. The passed in version is desirably compared to the operating system columns in the table and the version that is closest to the passed in version is used and its corresponding SKU is desirably returned to the calling application. Any system, method, or technique for comparing the passed in version with the version in table may be used. After returning the SKU associated with the closest version to the passed in value, the embodiment desirably exits at 170.

At 150, the API may have determined that the current operating system is unlicensed. Accordingly, the API may return a value to the calling application that indicates that the operating system is unlicensed. The application may then take whatever action the programmers specified in relation to an unlicensed operating system, such as defaulting to a crippled version of the application or aborting, for example. After returning the unlicensed value the embodiment desirably exits at 170.

At 160, the passed in version may have been determined to be lower than the minimum supported version. Accordingly, an error is desirable returned indicating that the passed in version is to low. Any system, method, or technique for generating an error may be used. After returning the error, the embodiment may exit at 170.

Figure 2:
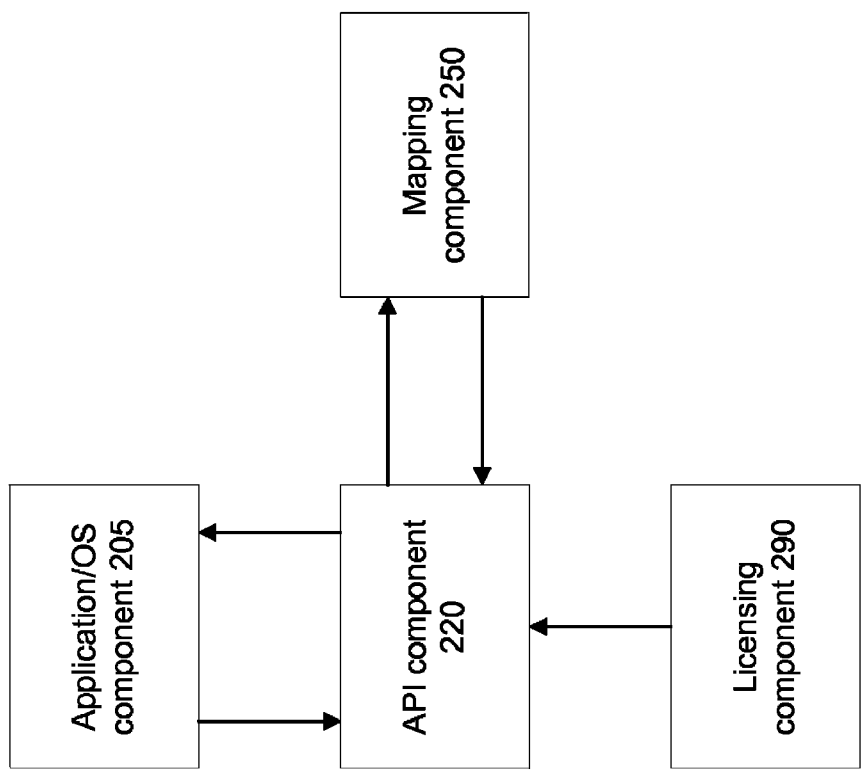
FIG. 2 is a block diagram illustrating an exemplary SKU determination system in accordance with the invention.

FIG. 2 is an exemplary system for SKU determination in accordance with the invention. The system may comprise several components. These components may include, but are not limited to: an applications component 205; an application programming interface (API) component 220; a licensing component 290; and a mapping component 250.

The application component 205 may be a part of an application initialization procedure. The application component 205 may attempt to determine the name, or SKU, corresponding to the operating system that the application component 205 is executing in. This operating system information may be used by the application component 205 to make certain run-time decisions such as activating or deactivating certain operating system dependent features. For example, an email application may be compatible with several versions of one or more operating systems. To facilitate easy distribution of the email application, a single binary may be distributed to users regardless of their underlying operating system. When the binary is subsequently executed on a system, the application component 205 may determine the actual operating system used by the system and enable or disable certain features or aspects of the application depending on the determined operating system. The application component 205 may determine the underlying operating system using the API component 220, for example. However, any system, method, or technique known in the art for determining the operating system may be used. The application component 205 may implemented using software, hardware, or a combination of both.

The API component 220 may be used by application(s) to determine the underlying operating system of the computer system. As described above, many applications rely on SKU information supplied by the operating system to work correctly. However, as operating systems change or are upgraded, a legacy application may not recognize the SKU or name of the current operating system returned. This can be particularly problematic where the upgraded operating system is capable of supporting applications designed to run on the older operating system, but the execution of the application fails because the application halts when it encounters the unrecognized SKU or operating system name.

To correct this problem, the API component 220 may accept as an argument some code or other indicator corresponding to the most current operating system that the calling application is aware of. For example, if the most up to date version of particular operating system at the time an application was written was X, the application desirably passes some indicator of this operating system X when it makes the call to the API component 220. The API component 220 may be implemented using software, hardware, or a combination of both. Any system, method, or technique known in the art for constructing an API may be used.

The mapping component 250 desirably locates and returns a SKU value corresponding to the indicator passed to the API component 220 by the application component 205. The mapping component 250 may maintain a table, or database comprising columns corresponding to operating system version indicators, with each column comprising rows corresponding to acceptable SKU values for that operation system. The table represents the SKU values that should be acceptable to an application created at the time associated with the operating system indicators. The table may be in a format similar to the table shown above. However, any suitable data structure may be used to hold the mapping data. The mapping component 250 may be implemented using software, hardware, or a combination of both. Any system, method, or technique known in the art for mapping data may be used.

The licensing component 290 may be used to determine the current operating system SKU and to ensure that the operating system possesses a valid license. The licensing component 290 may be called by the API component 220, for example. The licensing component 290 may reference an operating system license to determine the SKU of the current operating system. This SKU value, the current operating system version, and the passed in expected operating system from the API component 220, may be used by the mapping component 250 to retrieve the expected SKU from the table.

As an optional feature, the licensing component 290 may determine if the operating system possesses a valid license. If the licensing component 290 determines that the operating system is unlicensed, the API component 220 desirably returns some indicator that the application is unlicensed to the calling application. The licensing component 290 may be implemented using software, hardware, or a combination of both. Any system, method, or technique known in the art for product licensing may be used.

Exemplary Computing Environment

Figure 3:
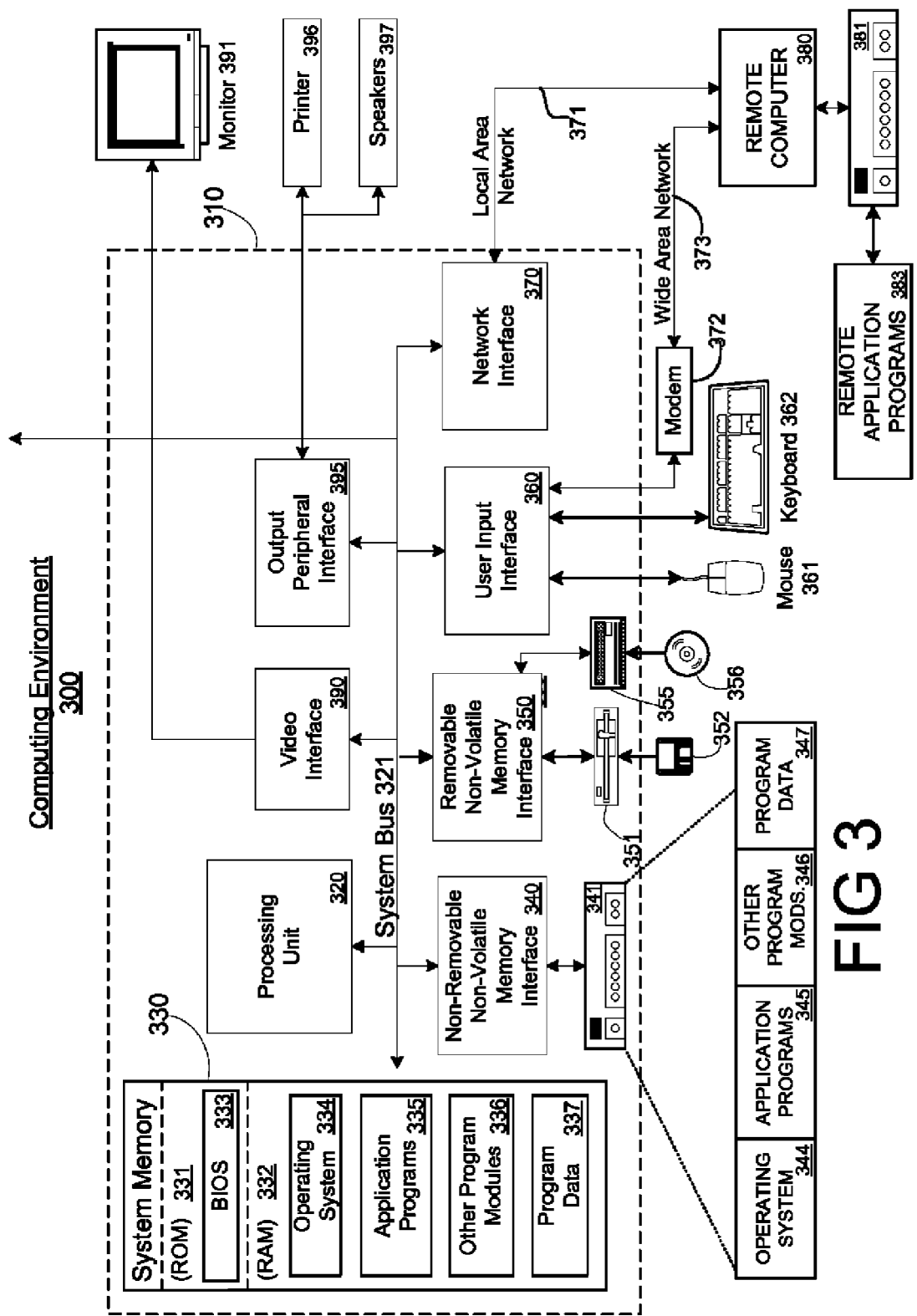
FIG. 3 is a block diagram showing an exemplary computing environment in which aspects of the invention may be implemented.

FIG. 3 illustrates an example of a suitable computing system environment 300 in which the invention may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 310. Components of computer 310 may include, but are not limited to, a processing unit 320, a system memory 330, and a system bus 321 that couples various system components including the system memory to the processing unit 320.

Computer 310 typically includes a variety of computer readable media. Computer readable media can be any available media that can be accessed by computer 310 and includes both volatile and non-volatile media, removable and non-removable media. By way of example, and not limitation, computer readable media may comprise computer storage media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

The system memory 330 includes computer storage media in the form of volatile and/or non-volatile memory such as ROM 331 and RAM 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/non-volatile computer storage media. By way of example only, FIG. 3 illustrates a hard disk drive 340 that reads from or writes to non-removable, non-volatile magnetic media, a magnetic disk drive 351 that reads from or writes to a removable, non-volatile magnetic disk 352, and an optical disk drive 355 that reads from or writes to a removable, non-volatile optical disk 356, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted include a LAN 371 and a WAN 373, but may also include other networks. Such networking environments are commonplace in offices, enterprise-wide computer networks, intranets and the internet.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method for operating system Stock Keeping Unit (SKU) determination, comprising:

at an application programming interface, receiving an indicator of a desired operating system from an application;

at the application programming interface, determining whether features of the desired operating system are supported by a current operating system;

if it is determined that the features of the desired operating system are supported by the current operating system, searching a table to locate a SKU corresponding to the indicator of the desired operating system, wherein the table comprises indicators of operating systems and at least one SKU corresponding to each indicator of an operating system;

providing the SKU corresponding to the indicator to the application if the SKU corresponding to the indicator is located; and if the SKU corresponding to the indicator of the desired operating system cannot be located:

searching the table for a SKU of an operating system that is the closest match to the indicator of the desired operating system; and providing the SKU corresponding to the indicator that is the closest match to the indicator of the desired operating system to the application.

2. The method of claim 1, wherein the indicator of the desired operating system is received through an application programming interface.

3. The method of claim 1, wherein the indicator of the desired operating system comprises an operating system major version indicator, and an operating system minor version indicator.

4. The method of claim 3, wherein the indicator of the desired operating system further comprises a service pack major version indicator, and a service pack minor version indicator.

5. The method of claim 1, wherein the indicator of the desired operating system corresponds to the most recent operating system that a programmer of the application is aware of.

6. The method of claim 1, further comprising determining if the indicator of the desired operating system is less than a minimum supported indicator of an operating system, and returning an error to the operating system if the indicator of the operating system is less than a minimum supported version.

7. The method of claim 1, further comprising determining if the desired operating system is not licensed, and returning an indicator that the desired operating system is not licensed if it is determined that the desired operating system is not licensed.

8. A system for Stock Keeping Unit (SKU) determination, comprising:

a memory having stored therein computer-executable instructions;

a computer processor that executes the computer-executable instructions;

requesting component adapted to request a SKU for an application, the request including an indicator of a desired operating system; and application programming interface component adapted to:
determine whether features of the desired operating system are supported by a current operating system;
if it is determined that the features of the desired operating system are supported by the current operating system, search a table to locate a SKU corresponding to the indicator of the desired operating system, wherein the table comprises indicators of operating systems and at least one SKU corresponding to each indicator of an operating system;
return a SKU to the application corresponding to the indicator of the desired operating system; and
if the SKU corresponding to the indicator of the desired operating system cannot be located:
searching the table for an SKU of an operating system that is the closest match to the indicator of the desired operating system; and
providing the SKU corresponding to the indicator that is the closest match to the indicator of the desired operating system to the application.

9. The system of claim 8, further comprising a licensing component adapted to determine if the desired operating system is licensed, and return an indicator of an unlicensed operating system if it is determined that the desired operating system is unlicensed.

10. The system of claim 8, wherein the application programming interface component is further adapted to determine if the indicator of the desired operating system is less than a minimum supported operating system, and return an indicator that the desired operating system is not supported to the application if the indicator of the desired operating system is less than a minimum supported operating system.

11. The system of claim 8, wherein the indicator of the desired operating system indicates the most current version of an operating system known when the application was generated.

12. The system of claim 8, wherein the indicator of the desired operating system comprises an operating system major version indicator, and an operating system minor version indicator.

13. The system of claim 12, wherein the indicator of the desired operating system further comprises a service pack major version indicator, and a service pack minor version indicator.

14. A computer-readable storage medium with computer-executable instructions stored thereon for performing the method of:

receiving an indicator of a desired operating system from an application through an application programming interface wherein the indicator of the desired operating system corresponds to the most recent operating system that a programmer of the application is aware of;

at an application programming interface, determining whether features of the desired operating system are supported by a current operating system;
if it is determined that the features of the desired operating system are supported by the current operating system, locating a Stock Keeping Unit (SKU) corresponding to the indicator of the desired operating system, wherein locating a SKU corresponding to the indicator of the desired operating system comprises searching a table for the indicator of the operating system, wherein the table comprises indicators of operating systems and at least one SKU corresponding to each indicator of an operating system; providing the SKU corresponding to the indicator to the application if the SKU corresponding to the indicator is located; and if the SKU corresponding to the indicator of the desired operating system cannot be located:
searching in the table for an SKU of an operating system that is the closest match to the indicator of the desired operating system; and
providing the SKU corresponding to the indicator that is the closest match to the indicator of the desired operating system to the application.

* * * * *